(12) United States Patent
Abramski

(10) Patent No.: US 6,469,918 B1
(45) Date of Patent: Oct. 22, 2002

(54) SOLID STATE CATHODIC PROTECTION SYSTEMS, METHODS FOR MAKING AND USING SAME

(75) Inventor: John Abramski, Richmond, TX (US)

(73) Assignee: Omcon, Inc., Stafford, TX (US)

( * ) Notice: Subject to any disclaimer, the term of this patent is extended or adjusted under 35 U.S.C. 154(b) by 0 days.

(21) Appl. No.: 09/642,719

(22) Filed: Aug. 21, 2000

Related U.S. Application Data
(60) Provisional application No. 60/150,089, filed on Aug. 20, 1999.

(51) Int. Cl.[7] .............................. H02M 1/12; C23F 13/00
(52) U.S. Cl. ............................. 363/45; 205/726
(58) Field of Search ................ 363/45, 48, 52, 363/37, 44; 204/196.02, 196.03; 205/726, 728; 307/95

(56) References Cited

U.S. PATENT DOCUMENTS 4,080,272 A * 3/1978 Ferry et al. .................. 205/726

OTHER PUBLICATIONS

The University of Oklahoma. College of Continuing Education. Norman, Oklahoma. 39th Annual Corrosion Control Course. Proceedings. 1992. pp. 1–412.

Chevron USA, Inc. Bakersfield Division Pipeling, Cathodic Protection Training Manual. Donald S. Hansen. Justification for Cathodic Protection; pp. 13–34.

* cited by examiner

*Primary Examiner*—Rajnikant B. Patel
(74) *Attorney, Agent, or Firm*—Robert W. Strozier

(57) ABSTRACT

A cathodic corrosion inhibiting apparatus is disclosed which is characterized by outputting a substantially square-wave rectified output from a AC input. The square-wave rectified output has a substantially constant DC component and a minimal AC component which allows the output to minimize large oscillations in electromotive potential about a DC mean associated with traditional rectified cathodic protection apparatus. The apparatus of this invention is also designed to be remotely monitored and controlled and can include self-monitoring and control circuitry to maintain a given degree of corrosion protection to a metallic apparatus.

16 Claims, 14 Drawing Sheets

SOLID STATE CATHODIC PROTECTION SYSTEMS, METHODS FOR MAKING AND USING SAME

RELATED APPLICATION

This application claims provisional priority to U.S. Provisional Patent Application Serial No. 60/150,089, filed Aug. 20, 1999.

BACKGROUND OF THE INVENTION

1. Field of the Invention

The present invention relates to solid state cathodic systems for reducing or preventing corrosion of metallic devices, structure or apparatus by applying a rectified DC potential across the metallic apparatus having a minimal AC component. The present invention also relates to methods for making and method for using the systems.

More particularly, this invention relates to solid state cathodic systems for reducing corrosion of metallic devices, structures, or apparatus where the cathodic systems transform, rectify and convert an AC input from an AC power source into a substantially square-wave output having a substantially constant DC component and a minimal AC component, i.e., the output appears substantially as a square-wave output when viewed at or near a frequency of the output and appears substantially as a DC output when viewed at a relatively long time. The present invention also relates to methods for making and method for using the systems.

2. Description of the Related Art

Prior art cathodic protection devices are known in the art such as those manufactured by JA Electronic of Stafford, Tex. These devices operate by applying an electric field across a metallic apparatus such as a pipe or a segment of pipe. The electric field and current associated therewith substantially reverse the electrochemical reactive of the metals to oxidative processes and corrosive processes which relate to the electrochemical behavior of metals in their metallic state. By applying an electric field and its associated current across the metallic apparatus, corrosion and rusting of the metal in the apparatus is reduced and even eliminated, greatly increasing the service life of the apparatus. These devices operate primarily by rectifying an AC source and applying the rectified field and current across the apparatus or a portion thereof. However, these prior art devices are not solid state devices, require high power overhead, are fairly large and difficult to control and monitor remotely and generally apply a simple rectified current to the apparatus.

Thus, there is a need in the art for compact cathodic protection apparatus using a standard AC input with reduced power overhead, improved remote control and monitoring capabilities and an output current wave form which produces a substantially pure DC output with a minimal residual AC component.

SUMMARY OF THE INVENTION

The present invention provides a solid-state square-wave cathodic apparatus including a rectifier unit for converting an AC input into a rectified output having an AC inlet and a converter unit for converting the rectified output into a square-wave rectified output. The apparatus also includes an outlet having an anodic terminal and a cathodic terminal. The rectified, square-wave output has a minimal AC component and appears as a substantially DC output when viewed at a relatively long time frame, affording better corrosion protection to a portion or all of a metallic apparatus, device or structure. The apparatus can also include remote control hardware and communication hardware and software so that the apparatus output can be monitored and remotely controlled to optimize the corrosion protection of the metallic structure.

The present invention provides a cathodic corrosion inhibiting apparatus including an inlet for receiving an AC current or connected to an AC power source. The apparatus also includes a transformer unit for changing a voltage and current of the AC input to form a transformed AC output. The apparatus further includes a solid state rectifier unit for converting the transformed AC output into a rectified output and a converter for converting the rectified output into a substantially rectified, square-wave output. The apparatus also includes outlets having an anodic terminal and a cathodic terminal. The rectified, square-wave output has a minimal AC component and appears as a substantially DC output when viewed at a relatively long time frame, affording better corrosion protection to a portion or all of a metallic apparatus, device or structure. The apparatus can also include remote control hardware and communication hardware and software so that the apparatus output can be monitored and remotely controlled to optimize the corrosion protection of the metallic structure.

The present invention also provides a cathodically protected metallic apparatus including an AC power source connected to the AC input of the cathodic corrosion inhibiting apparatus of the present invention, a cathodic corrosion inhibiting apparatus of the present invention, and a metallic apparatus connected to the power and ground terminals of the cathodic corrosion inhibiting apparatus of this invention, where the cathodic, apparatus produces a square-wave output which appears as a substantially DC output when viewed on a relatively long time frame and the output provides better corrosion resistance to the metallic apparatus.

The present invention also provides a cathodically protected pipeline including a pipeline and a plurality of cathodic units of the present invention located at given intervals along the pipeline to reduce corrosion at all point along the length of the pipeline.

The present invention further provides a method for inhibiting corrosion of metallic apparatus including applying a substantially DC current across the apparatus or a portion of the apparatus where the substantially DC current comprises a substantially square-wave output signal having sufficient voltage, current and power to maintain the structure at a voltage of at least about −850 mV DC.

The present invention still further provides a method for making the a solid-state square-wave cathodic apparatus of this invention.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
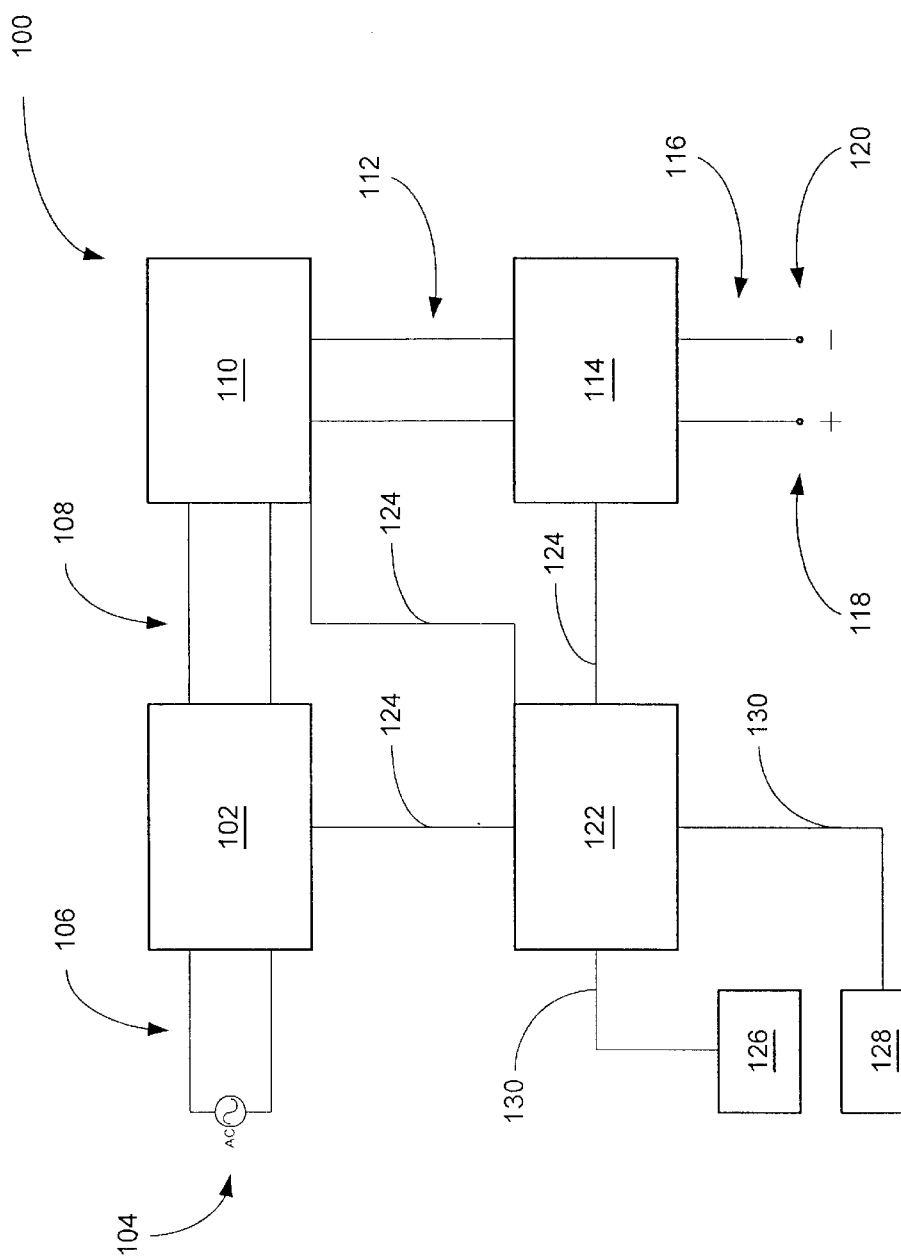
FIG. 1 depicts a block diagram of a preferred embodiment of a solid-state cathodic protection apparatus of the present invention.

The inventors have found that a compact, solid-state cathodic protection apparatus can be constructed that reduces power consumption, increases control and monitoring efficiency and provides for efficient remote and on-site automated control. The apparatus of this invention are designed to protect metallic devices, structures or apparatus such as pipe lines, metal conduits and other metallic devices from corrosion. The inventors have also found that better protection can be afforded the metallic devices by applying across the device or portions thereof a square-wave rectified signal, where the square-wave signal appears as a substantially DC current when viewed on an oscilloscope over a relatively long time scale. The use of a square-wave rectified signal provides improved protection because a square-wave rectified AC source more purely reproduces a static DC source than does a full-wave or half-wave rectified or a filtered full-wave or half-wave rectified AC source.

Cathodic protection operates by applying an electromotive potential across a metallic structure or a portion thereof to convert the entire structure to a cathode and to promote corrosion at a sacrificial anode site buried near the structure or the portion thereof. The cathodic protection unit operates by ensuring that the metallic structure is cathodic thus reducing or eliminating electrochemical corrosion between anodic and cathodic sites or areas on the metallic structure induced by differences in soil type, aeration, and wetness. Generally, satisfactory protection can be achieved by maintaining a voltage difference between the metallic structure and sacrificial anode be at least −0.85V or −850 mV and generally between about −0.85V or −850 mV to about −2.5V or −2500 mV. Preferably, the cathodic voltage is maintained between about −850 mV and about −2000 mV and particularly, between about −850 mV and about −1500 mV. Of course, the optimal protection voltage will depend on the metallic structure being protected, the soil and environmental conditions and other factors.

Once anodic and cathodic areas are formed in a metallic structure, the soil acts as an electrolytic medium completing a circuit between the anodic and cathodic areas or sites and starts the electrochemical reaction which corrodes the anodic site causing pitting in the metallic structure.

Cathodic protection to reduce, prevent or inhibit corrosion is well established for the protection of metal structures, such as well casings and pipe lines, that are buried in conductive soils. Cathodic protection is also used for the protection of inner surfaces of tanks which contain corrosive solutions, as well as for the protection of sub-platforms, and other offshore metal structures. Cathodic protection can be accomplished either by using sacrificial anodes electrically grounded to the structure to be protected, or by the application of low voltage direct current from a power source. Steady or substantially constant direct current can include regular DC current as well as half or full wave rectified current, and pulsed direct current.

When a cathodic protection current is applied to a circuit including the structure (cathode) to be protected and its associated anode, a layer of charge is formed at or near the surface or at a depth in the surface up to approximately 100 Å from the surface of the structure. This layer acts as a capacitor in series with the anode-cathode circuit.

The structure to be protected, such as a pipeline or well casing, the anode and the leads connecting such elements to the voltage source act as an inductive (as well as a resistive) load to current flow. The soil between the anode and the structure also provides a resistive load of less than about one to about several ohms.

In the absence of a cathodic protection system, the soil or other conductive corrosive medium to which a ferrous metal structure such as a steel pipeline is exposed will cause an adverse chemical reaction in which metallic iron atoms are oxidized surrendering electrons to the structure to form positively charged iron ions or salts that pass into the electrolyte (soil, solution, etc.). Hydrogen ions or other positively charged ions in the electrolyte accept the free liberated electrons by the oxidation of iron atom and form a hydrogen gas or the reduced states of other positively charged electron acceptors adjacent to the surface of the structure. Oxygen molecules and certain other substances, if present in the electrolyte, will also accept the electrons. This action results in a loss of iron in the structure with a consequent degradation of structural integrity. When applying a protective voltage across the apparatus or a portion thereof, over production of hydrogen gas can and often does result in the deterioration of protective coating on the structure, so that careful control of the applied voltage and current is necessary to optimize cathodic protection and minimize deterioration of the protecting coatings.

Direct current cathodic protection systems reduce, prevent or inhibit the electrochemical oxidation of iron atoms of the structure, the loss of iron ions into the electrolyte and the amount of free electrons on the structure or portions thereof. The electrons supplied by the cathodic protection systems reduce oxidizing agent such as oxygen and/or electron acceptors such as hydrogen ions concentrations at the surface of the structure. The cathodic protection systems, thus, inhibit the loss of iron atoms in the structure or portions thereof. As a general rule, the greater the amount of current (accumulated electrons per unit of time) that is supplied by the cathodic protection system, the greater will be the area of the structure protected.

A typical steady state 15 volt and 15 ampere dc cathodic protection system offers good protection, but provides only a limited umbrella of protection or "throw" along the structure such as a pipeline to be protected. Such steady state systems thus require a considerable number of protection stations for a given length of the structure or pipe to be protected. Increasing the amount of current supplied by increasing the voltage, will increase the throw. The average current must, however, be limited such that an excess of hydrogen gas is not generated at the point of application of the cathodic protection system. An excess of hydrogen may cause damage to protective coatings. Excess hydrogen can also permeate the pipe wall, causing embrittlement of the pipe materials leading to cracking or rupture.

Cathodic protection systems utilizing AC sources are known in the art. Typically, these systems first transform the AC line voltage to an acceptable lower voltage (step down the voltage) and then either half-wave or full-wave rectify the signal. However, these AC-based systems generally have a significant AC component to the supplied current to the apparatus to be protected. These significant AC components can result in electrocution of animals including humans in close proximity to or in contact with the apparatus. The AC component can also cause electrical discharges or sparking the can cause other problems. The present invention results in an AC rectified output with a minimal AC component minimizing or eliminating these problems and improving the protection of apparatus to which it is attached.

Broadly, the apparatus of the present invention includes a cathodic protection system that converts an AC source in to a full-wave or half-wave rectified square-wave output. The AC source is first forwarded to a transformer unit that transforms the AC input into a transformed AC output having the same or different voltage and/or the same or different current as the AC input. The transformed output is forwarded to a rectifier unit that converts the transformed AC output into a full or half-wave rectified output. The rectified, transformed output is then forwarded to a converter unit that converts the rectified, transformed output into a square-wave, transformed, rectified output signal. The apparatus also includes a positive and negative or cathodic and anodic terminals; the cathodic terminal is designed to be connected to a metallic structure or device and the anodic terminal is designed to be connected to a common ground or device or a sacrificial anode,. The square-wave output signal when measured over a long time scale, i.e., a scale sufficiently greater than the frequency of the square-wave output, appears as a substantially DC output having less than about a 12% ripple or AC component to the output signal, preferably, less than about a 10% ripple, particularly, less than about a 7.5% ripple, more particularly, less than about a 5% ripple, especially, less than about 3% ripple and ultimately, less than about 1% ripple. The output square-wave signal generally will have an output between about 40V/5 A and about 200V/200 A, a power rating between about 200 VA and about 4 kVA, and a switching frequency between about 15 kHz and about 30 kHz, preferably between about 15 kHz and about 25 kHz and particularly between about 20 kHz and about 23 kHz.

Broadly, the method for protecting metallic structures includes the step of transforming an AC source in a transformer unit or circuit component to a transformed AC output. The transformed output is then rectified in a rectifier unit or circuit component to a rectified, transformed output. The rectified, transformed output is than converted in a converter unit or circuit component to form a square-wave, rectified, transformed output. The square-wave output is then connected across a metallic structure and a sacrificial anode at a sufficient voltage and current level to reduce or substantially inhibit corrosion of the metallic structure.

The present invention can also include direct or wireless communication hardware and software as well as an operating system for remote or automated control, where the voltage, current, current density, square-wave frequency, or other power components are monitored and adjusted manually or automatically to afford optimal or substantially optimal corrosion protection to the metallic structure. The additional hardware and software can be either directly incorporated into or onto the circuitry that controls the conversion of the AC source into a square-wave, transformed, rectified output signal or can be contained in an associated unit. Of course, the control software can be off-site, where the protection apparatus sends data to the off-site computer on a continuous or discrete and preferably time-averaged basis to the off-site computer, which in turn analyzes the data and forwards control data streams to the protection apparatus to change output parameters (voltage, current, current density, square-wave frequency, etc.) so that the output can maintained at a substantially optimal level of corrosion protection to the metallic structure.

The cathodic protection systems of the present invention can also include communication hardware and software to allow manual and automated control of system parameters including at least voltage, current, frequency of the square-wave oscillations.

The cathodic protection systems of the present invention can also include hardware and software for onsite or remote monitoring and control. Thus, the system parameters can be controlled by automated software designed to maintain the cathodic protection of the structure at an optimal level at each local site or across the entire structure, if the structure has a plurality of separate protection systems. The software systems that can be used for such control are commercially available and well-known in the art. Of course, the software has to be configured to achieve the desired interaction between the monitoring and control site and each individual protection unit. Moreover, each protection system used to protect a large structures such as a pipeline can be monitored and controlled from a single remote site using traditional phone line connection (wired), internet connections (wired or wireless) and wireless connections as is well-known in the art.

Suitable AC sources include, without limitation, one or three phase AC having a voltage of 120, 240, 480 or the like and having a frequency between about 50 and 60 Hz. However, any AC source can be used provided it can supply sufficient power to drive the systems of this invention. Of course, for units sold outside of the United State, the AC sources may have different voltages and currents.

Suitable rectifier units include, without limitation, one or three phase, half wave or full wave (full wave preferred) bridges operative between about 50 and 60 Hz or diode bridges with selected current and power ratings for the input and output desired as is well-known in the art.

Suitable transformer units include, without limitation, static or variable transformer or combinations of transformer for converting a desired AC input into a desired AC output as is well-known in the art. The variable transformer can be tunable such as variacs or include several pre-set output settings - taps into the transformer coils to decrease or increase the number of turns in the transformer circuit.

Referring now to FIG. 1, a generalized solid-state cathodic protection apparatus of the present invention, generally 100, is shown to include a transformer unit 102 connected to an AC source 104 which converts an AC input 106 into a transformed output 108. The transformed output 108 is forwarded to a rectifier unit 110 which converts the transformed output 108 into a rectified output 112. The rectified output 112 is forwarded to a converter unit 114 which converts the rectified output 112 into a square-wave rectified output 116. The apparatus 100 also includes a cathodic terminal 118 and an anodic terminal 120. The apparatus 100 can further include a control unit 122 in electrical communication with the transformer unit 102, the rectifier unit 110 and the converter unit 114 by connection elements 124, where the control unit 122 controls the rectified square-wave output 116 with respect to voltage, current and/or frequency. The control unit 122 can also include hardware and software for manual and/or remote control capabilities including hard wired or wireless communication hardware and software. The apparatus 100 can also include lighting protection circuitry 126, battery backup circuitry 128, and other auxiliary circuitry in electrical communication with the units in the apparatus 100 shown as connection elements 130.

Figure 2:
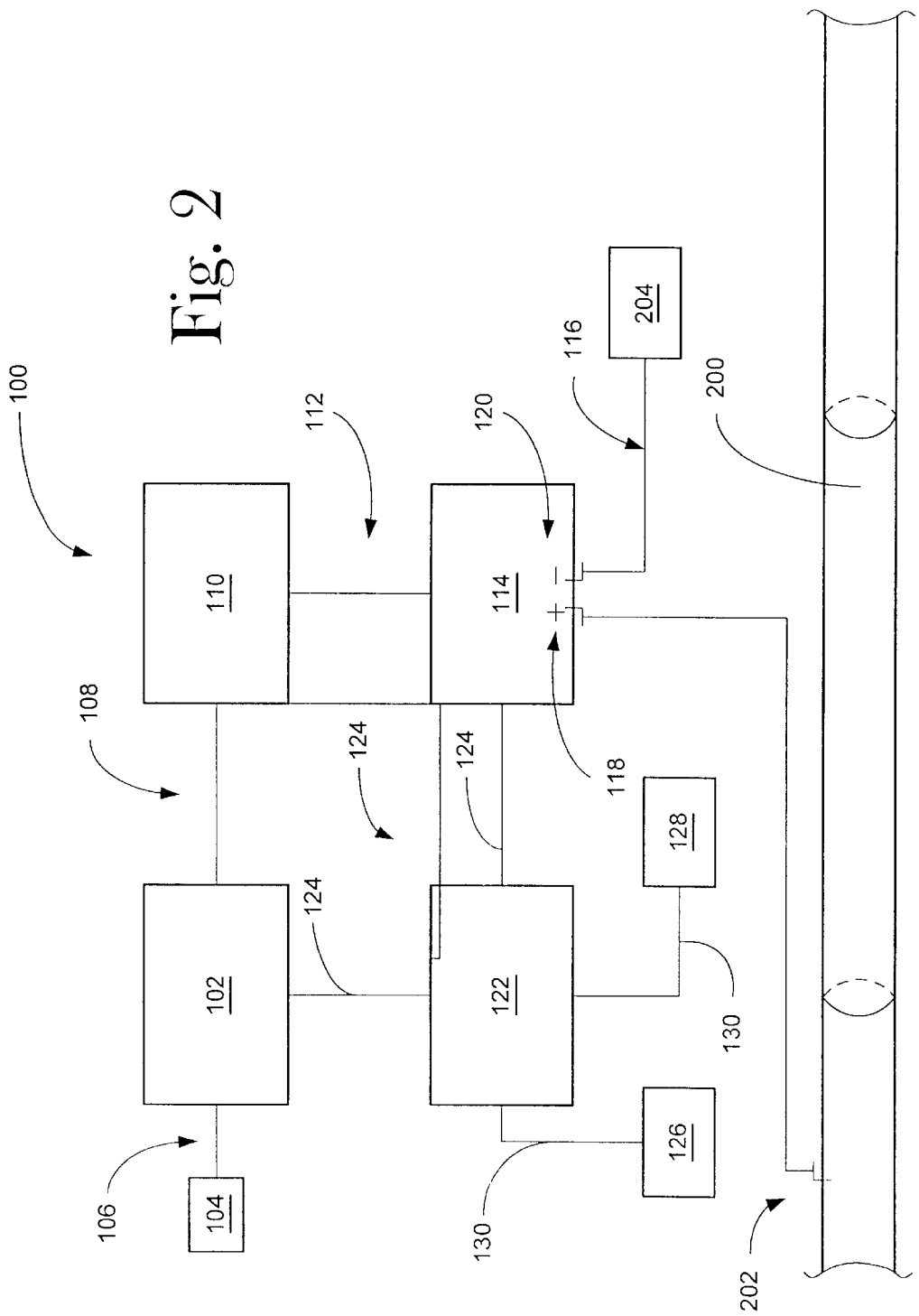
FIG. 2 depicts a block diagram of the solid-state cathodic protection apparatus of FIG. 1 connected to a portion of a pipeline.

Referring now to FIG. 2, an apparatus of the present invention, generally 100 is shown connected to a portion of a pipe 200 where the cathodic terminal 118 is connected to the pipe 200 at a position 202 and the anodic terminal 120 is connected to a sacrificial anodic unit 204. Although FIG. 2 illustrates the use of the apparatus of FIG. 1 in the protection of a portion of a pipeline, the apparatus of the present invention can be used to protect any metallic structure such as storage tanks, bridges, towers, or any other metallic structure that is subject to electrochemical corrosion.

Figure 3:
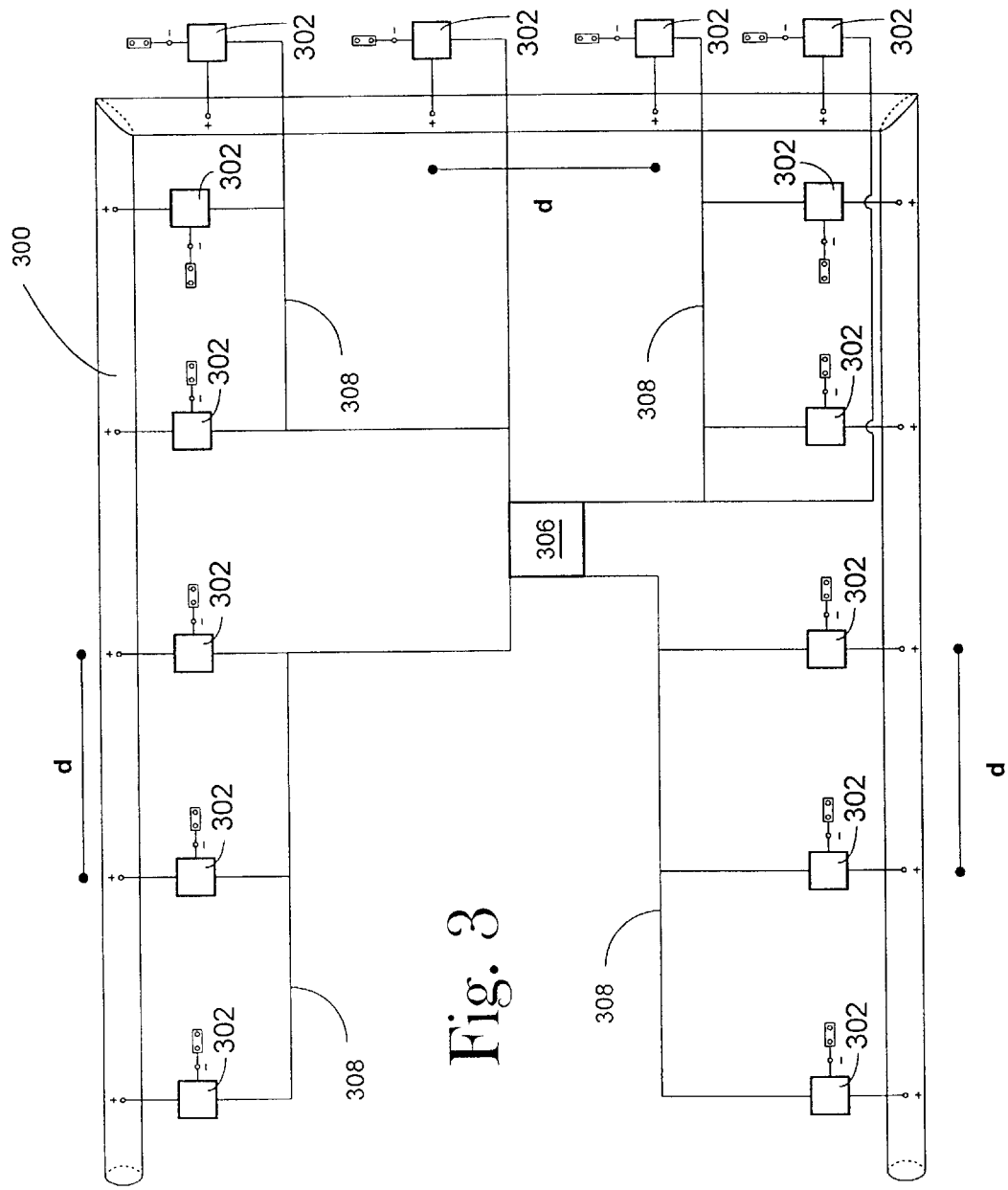
FIG. 3 depicts a block diagram of the solid-state cathodic protection apparatus of FIG. 1 connected to a pipeline at a plurality of locations along the pipeline incorporating optional communication hardware and software connected to a remote control apparatus.

Referring now to FIG. 3, a pipeline generally 300 protected by a plurality of apparatus 302 of the present invention positioned along a length of the pipeline 300 at positions 304 separated one from the other by a separation distance d. The plurality of apparatus 302 can also be connected to a central control computer 306 via communication pathways 308. The communication pathways 308 can be either hard wired, i.e., traditional phone lines, or wireless via cellular or other types of wireless communication hardware and software. The central control computer 306 can include hardware and software for continuously or periodically monitoring or adjusting the output of the apparatus 302 so that the protection of the pipeline 300 can be optimized and maintained in a substantially optimal corrosion prevention state. Generally, the separation distance d is between about 1 mile and about 50 miles, preferably between about 5 miles and about 25 miles and particularly between about 5 miles and about 20 miles. Of course, the soil and other environmental conditions will affect the optimal separation distance between the apparatus 302 as well as the type of material making up the pipe in the pipeline. For protection of one or more pipelines in close proximity to each other and made of different materials that could support electrochemical reactions mediated by the soil, the cathodic protection systems of the present invention will require tuning so that optimal protection can be afforded to each pipeline separately and collectively.

Figure 4:
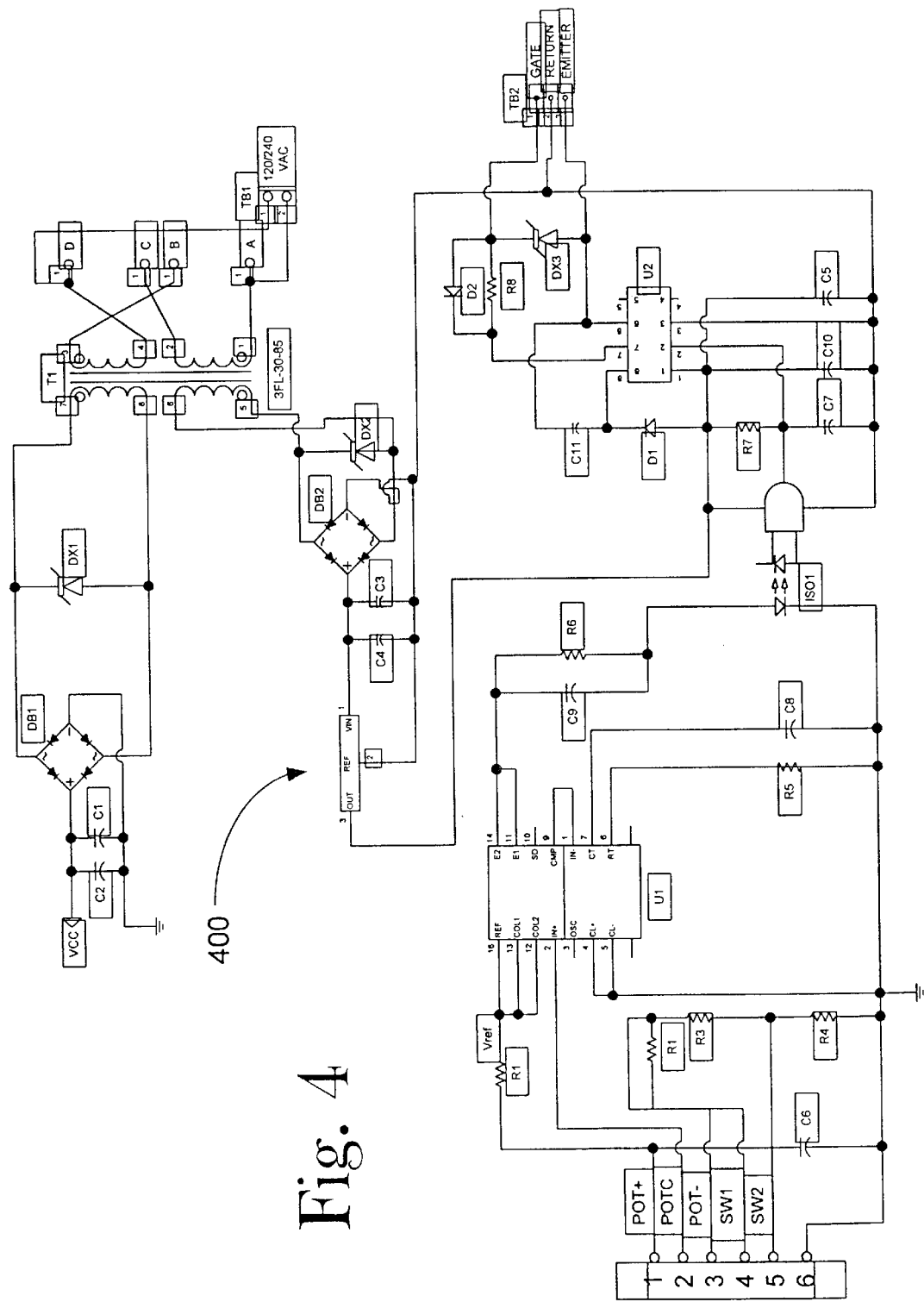
FIG. 4 depicts a circuit of a preferred embodiment of the apparatus the present invention.

Referring now to FIG. 4, a schematic of a preferred embodiment of the cathodic protection system of the present invention, generally 400, includes standoffs D, C, B, and A, eleven capacitors C1, C2, C3, C4, C5, C6, C7, C8, C9, C10, and C11, two bridge rectifiers DB1 and DB2, three surge arrestor or transient voltage suppressor DX1, DX2 and DX3, two diodes D1 and D2, one comparitor ISO1, two jumpers JP1 and JP1A, eight resistors R1, R2, R3, R4, R5, R6, R7 and R8, an input terminal block TB1, an output terminal block TB2, a transformer T1, two integrated circuits U1 and U2 and a variable resistor VR1. The components are in the shown electrical connection schematic. The component specifications are list set forth in Table 1.

TABLE 1

| Component List | | |
|---|---|---|
| Standoffs | Ref | D, C, B, A |
| Capacitor | C1–4 | CR04, 220 μFD, ALUM 35 V |
| Capacitor | C5–6 | MR04 0.1 μFD, 50 V |
| Capacitor | C7 | MR04, 47 nFD, 50 V |
| Capacitor | C8 | MR04 3330 pFD, NPO, 50 V |
| Capacitor | C9 | MR04, 100 pFD, 50 V |
| Capacitor | C10 | CR02 1 μFD, TAN, 35 V |
| Capacitor | C11 | CR02 10 μFD, TAN, 35 V |
| Bridge Rectifiers | DB1, DB2 | W02G |
| Surge arrestor | DX1, DX2, DX3 | SA20CA |
| Diodes | D1, D2 | IN4003 |
| Comparitor | ISO1 | H11N2 |
| Jumpers Blocks | JP1, JP1A | HEADER 6 |
| Resistor | R1 | R ¼ W, 4.7K, 1% |
| Resistor | R2 | R ¼ W, 2.2K, 1% |
| Resistor | R3 | R ¼ W, 5.7K, 1% |
| Resistor | R4, R6 | R ¼ W, 1K, 1% |
| Resistor | R5 | R ¼ W, 15K, 1% |
| Resistor | R7 | R ¼ W, 270, 1% |
| Resistor | R8 | R ¼ W, 33, 1% |
| Terminal Block | TB1 | TB2 |
| Terminal Block | TB2 | TB3 |
| Transformer | T1 | 3FL-30-85 |
| Integrated Circuit | U1 | SG2524 |
| Integrated Circuit | U2 | IR2117 |
| Variable Resistor | VR1 | LM7815\UP, 15 V |

Although a preferred circuit is set forth in FIG. 4 and the preferred electrical elements and electrical contacts are shown, it should be recognized that other circuit designs can be constructed by skill artisans to yield the same square-wave output of the present invention and such other circuit designs are considered a part of this disclosure or equivalent to the circuit set forth in FIG. 4.

Figure 5:
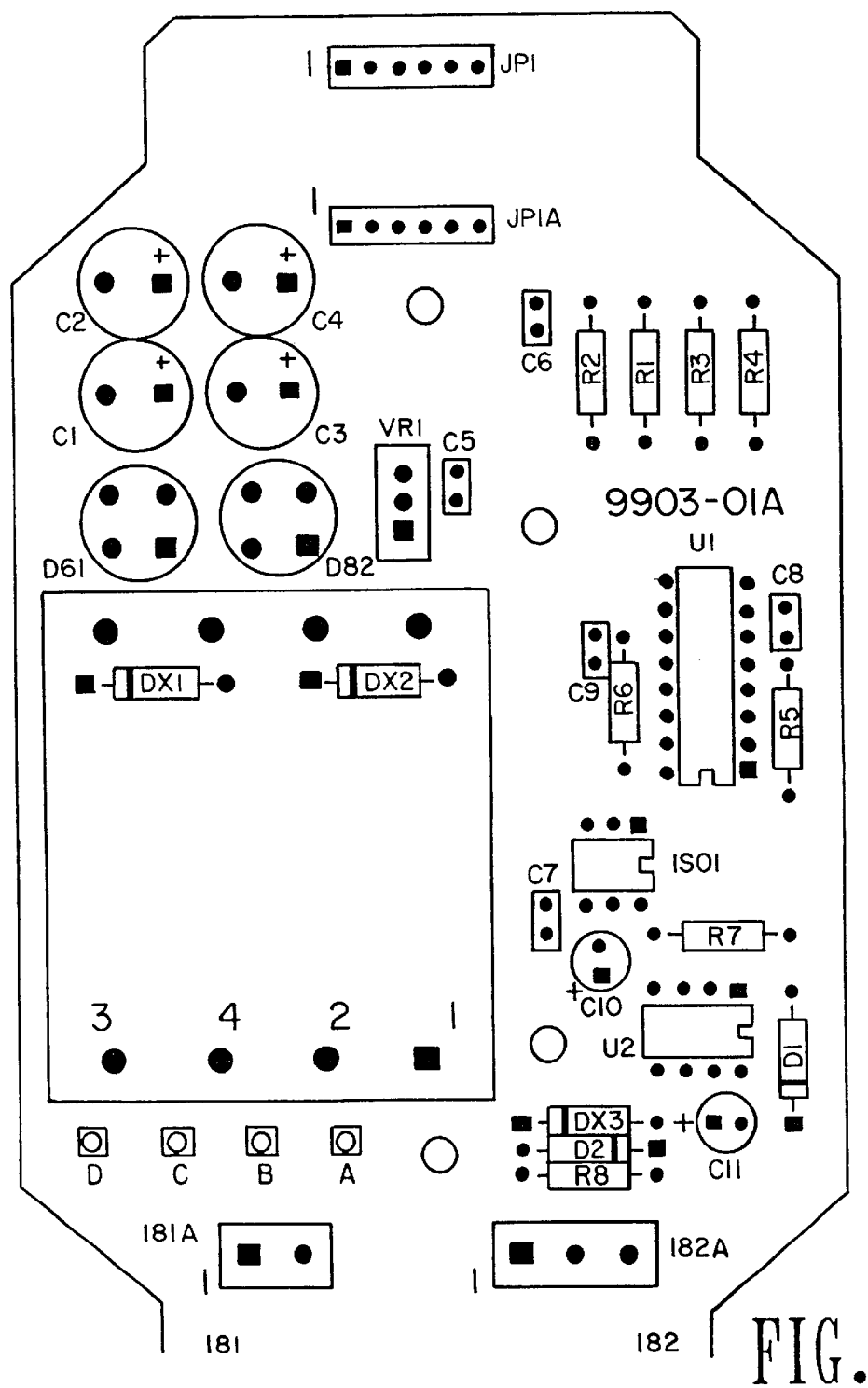
FIG. 5 depicts a preferred printed circuit board for the apparatus of FIG. 5.

Referring now to FIG. 5, a preferred printed circuit board 500 for mounting the above listed components and implementing the electrical connections between the components. The components as previously labeled are set forth on the board 500.

Figure 6:
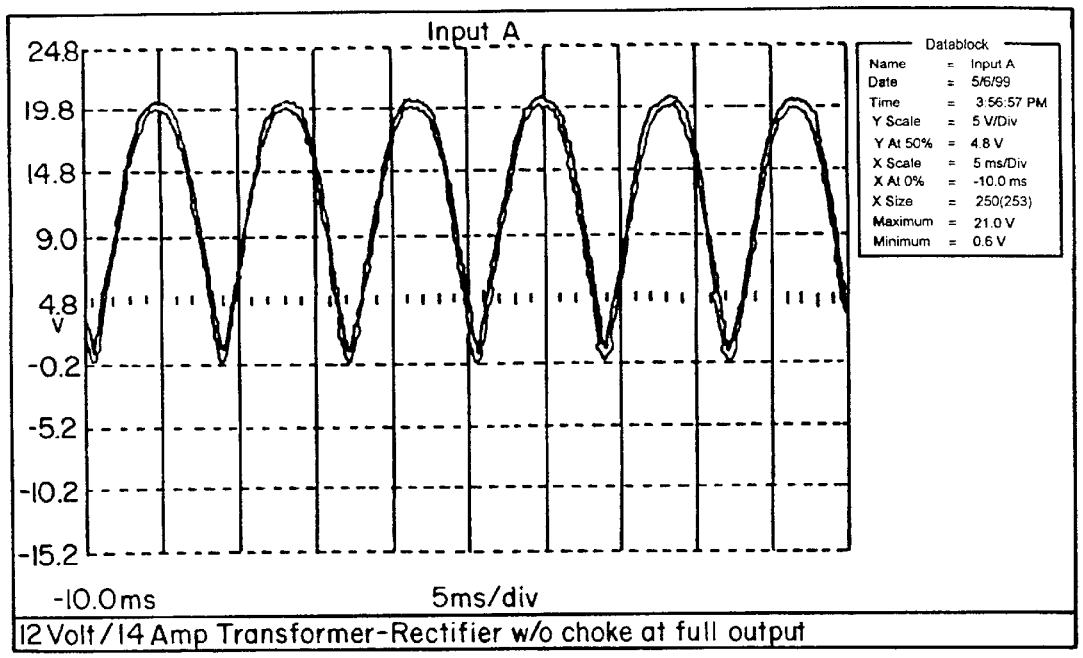
FIG. 6 plots a wave form of a full wave rectified output of a prior art cathodic protection apparatus.
Figure 7:
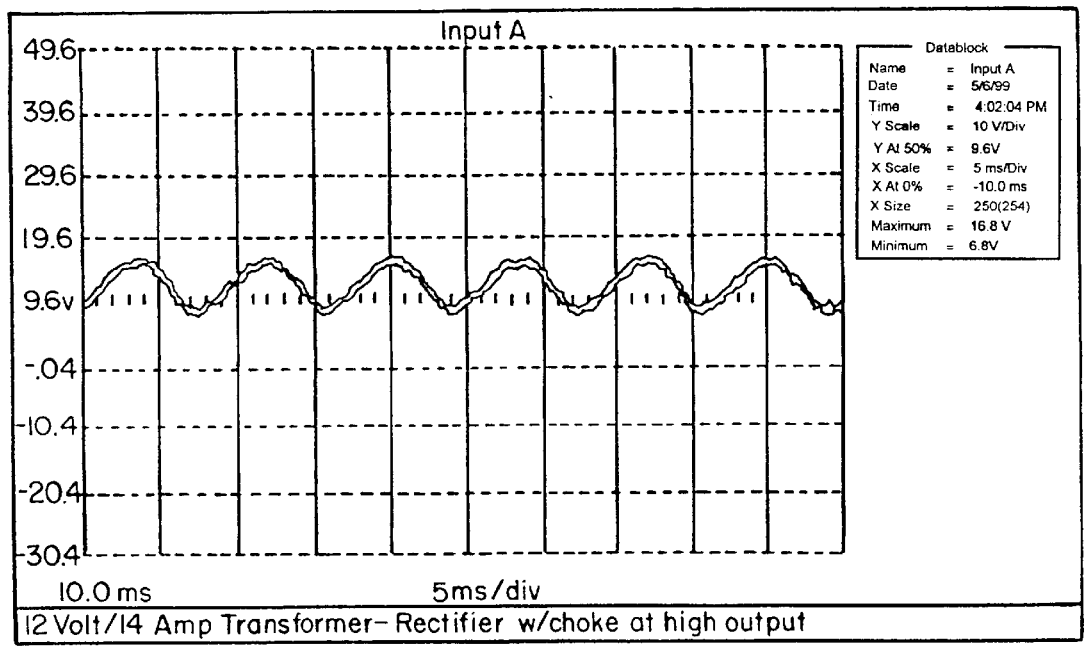
FIG. 7 plots a wave form of a filtered, fall wave rectified output of a prior art cathodic protection apparatus.
Figure 8:
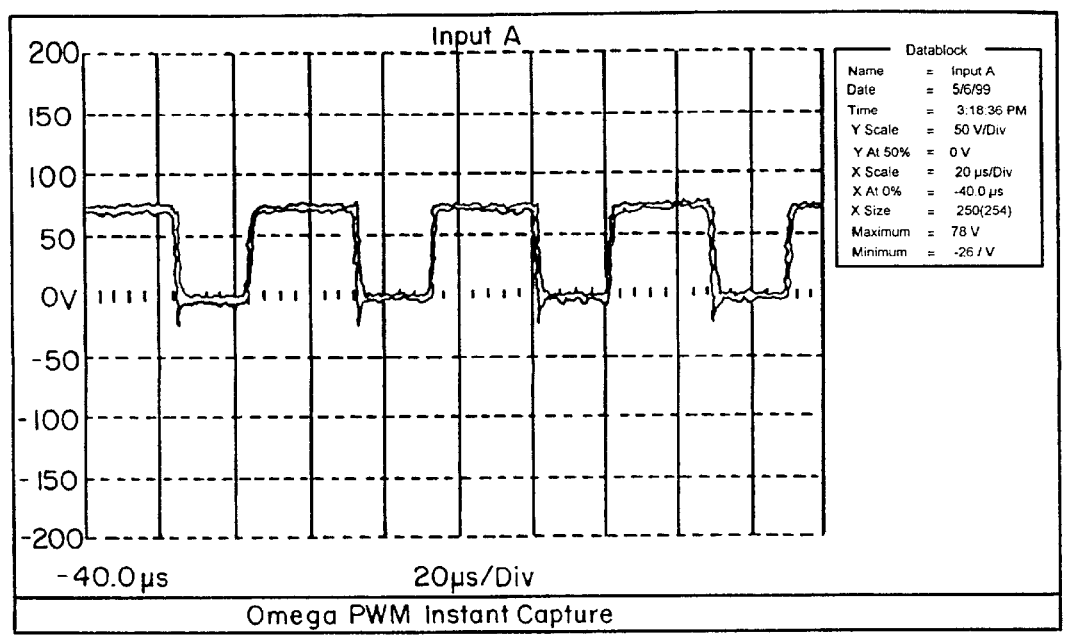
FIG. 8 plots a wave form of a rectified square-wave output of the apparatus of FIG. 5.

Referring now to FIG. 6, the wave form of a prior art cathodic protection unit having a full wave rectified output signal is shown. Referring now to FIG. 7, the wave form of a prior art cathodic protection unit having a full wave, chocked rectified output signal is shown. Referring now to FIG. 8, the wave form of the cathodic protection unit of the present invention having a full wave rectified, substantially square-wave output signal is shown.

Figure 9:
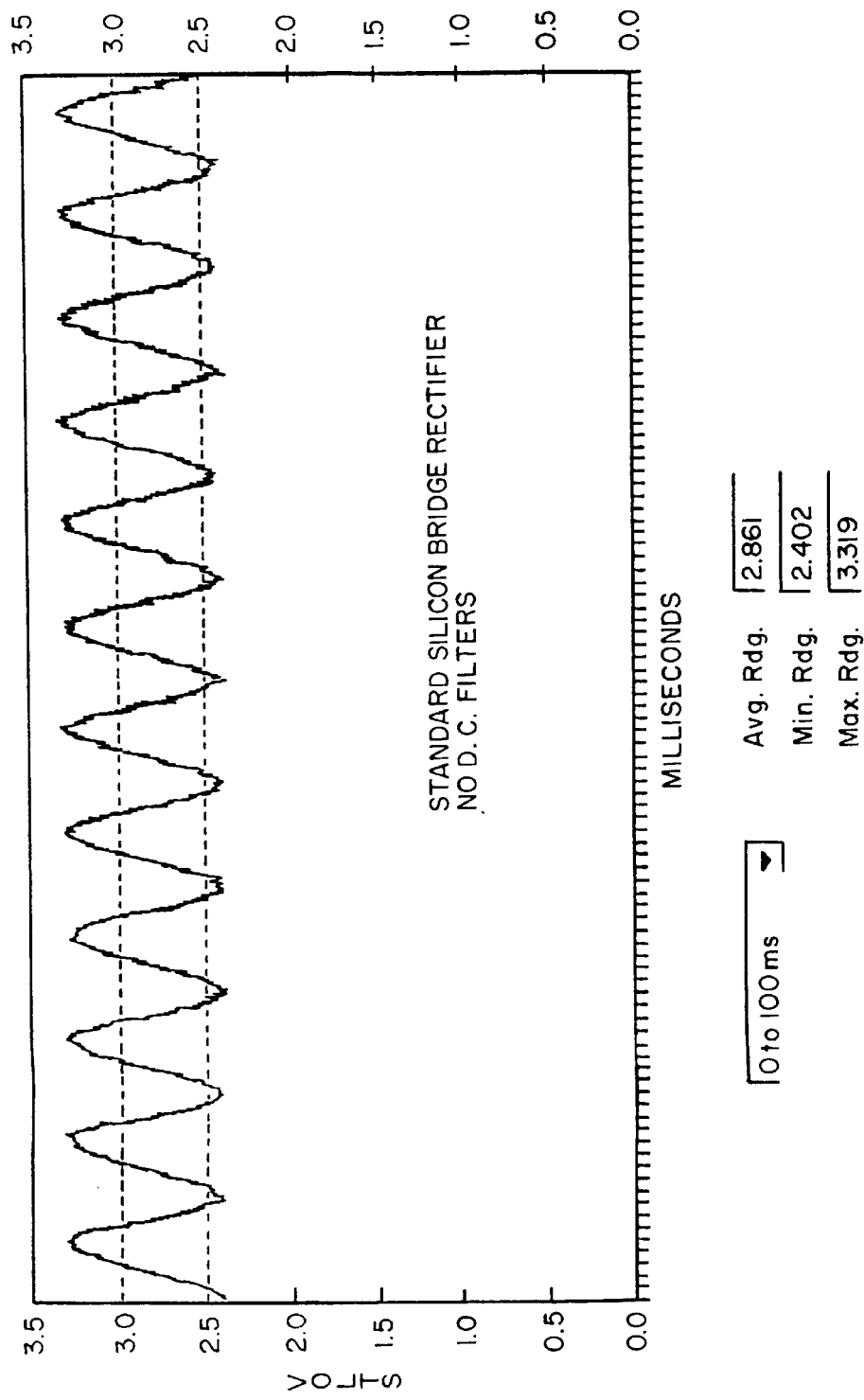
FIG. 9 plots a power output of a full wave rectified output of a prior art cathodic protection apparatus.
Figure 10:
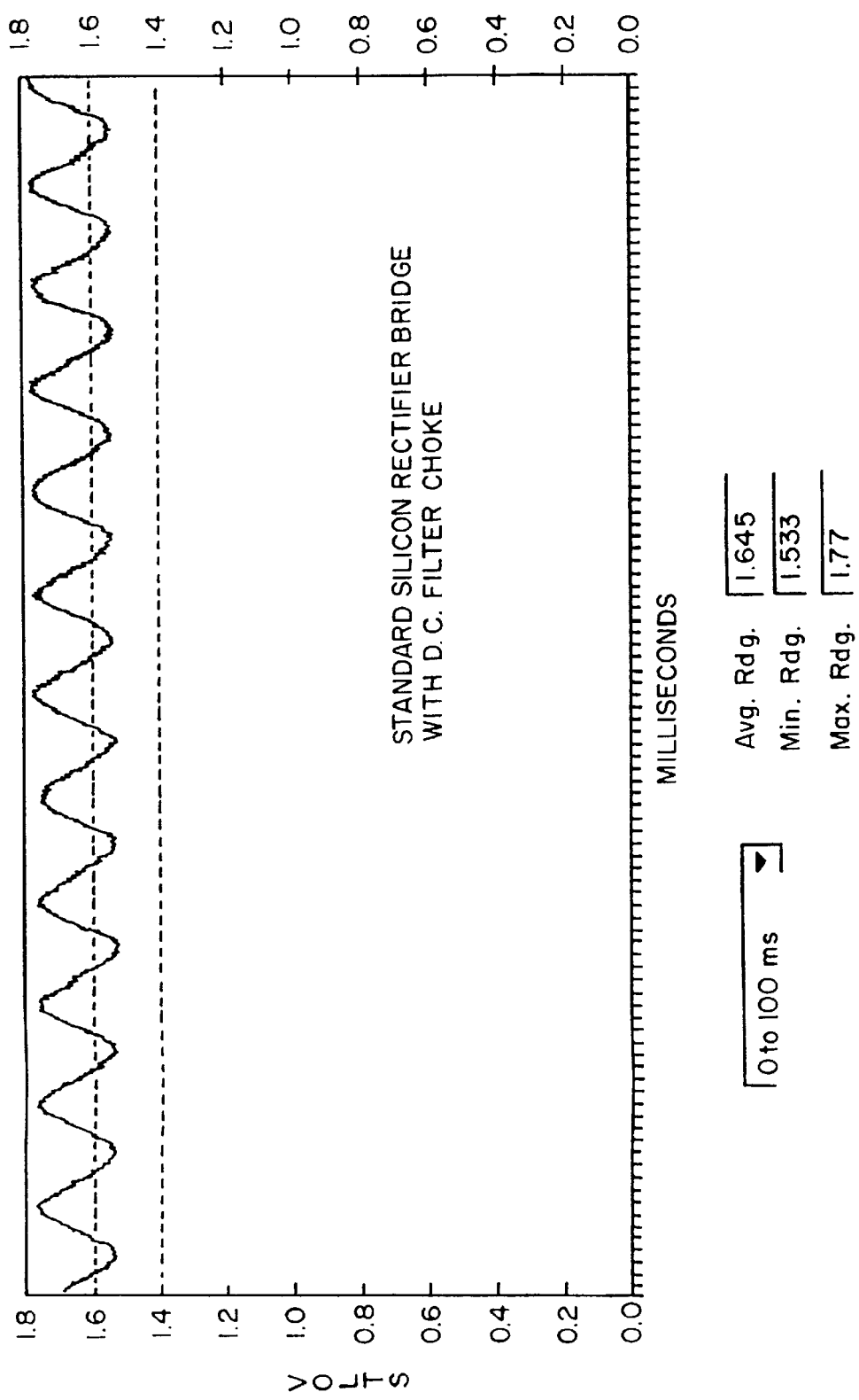
FIG. 10 plots a power output of a filtered, full wave rectified output of a prior art cathodic protection apparatus.
Figure 11:
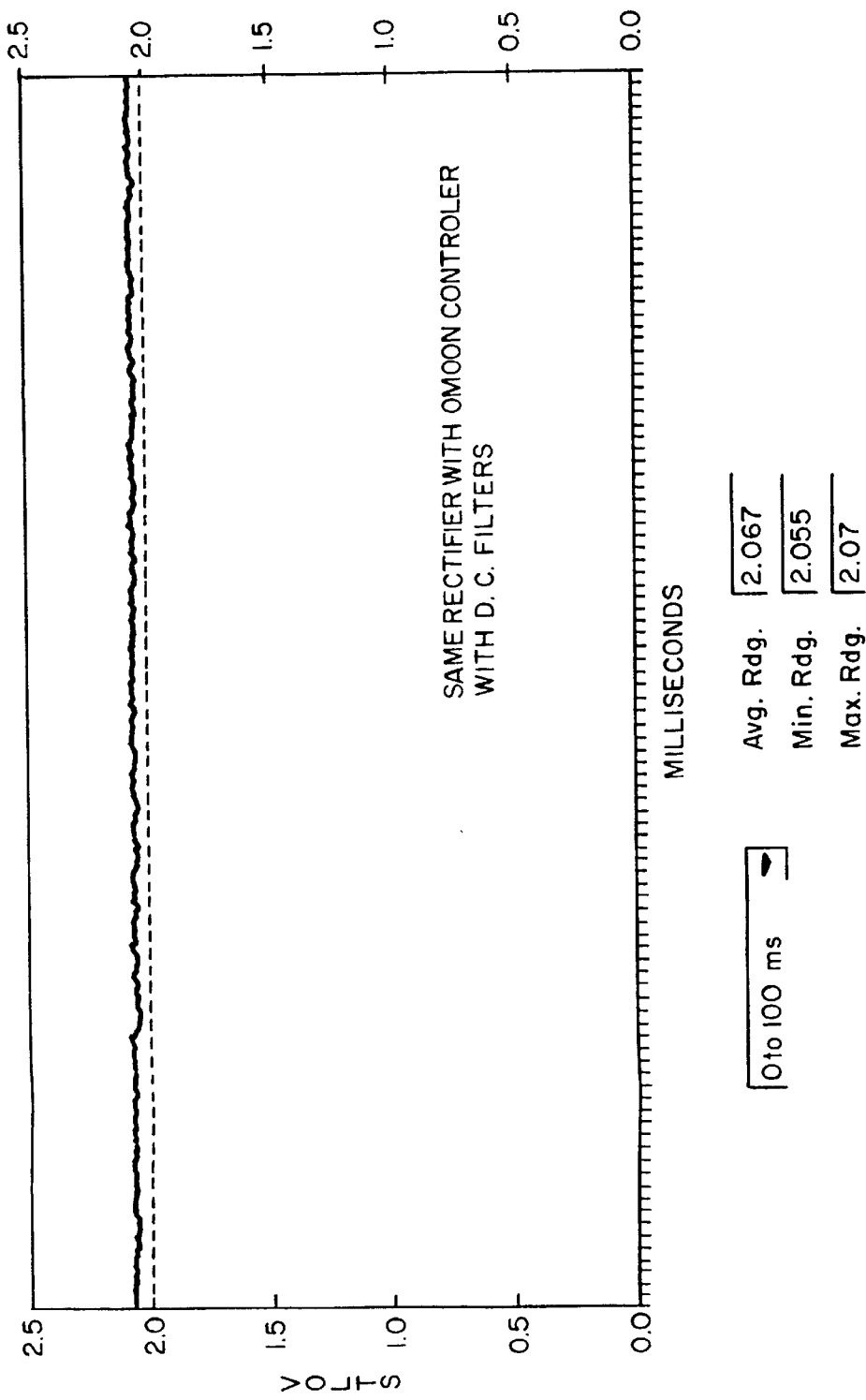
FIG. 11 plots a power output of a rectified square-wave output of the apparatus of FIG. 5.

Referring now to FIG. 9, the power output of a prior art cathodic protection unit having a full wave rectified output signal is shown. Referring now to FIG. 10, the power output of a prior art cathodic protection unit having a full wave, chocked rectified output signal is shown. Referring now to FIG. 11, the power output of the cathodic protection unit of the present invention having a fall wave rectified, substantially square-wave output signal is shown.

Figure 12:
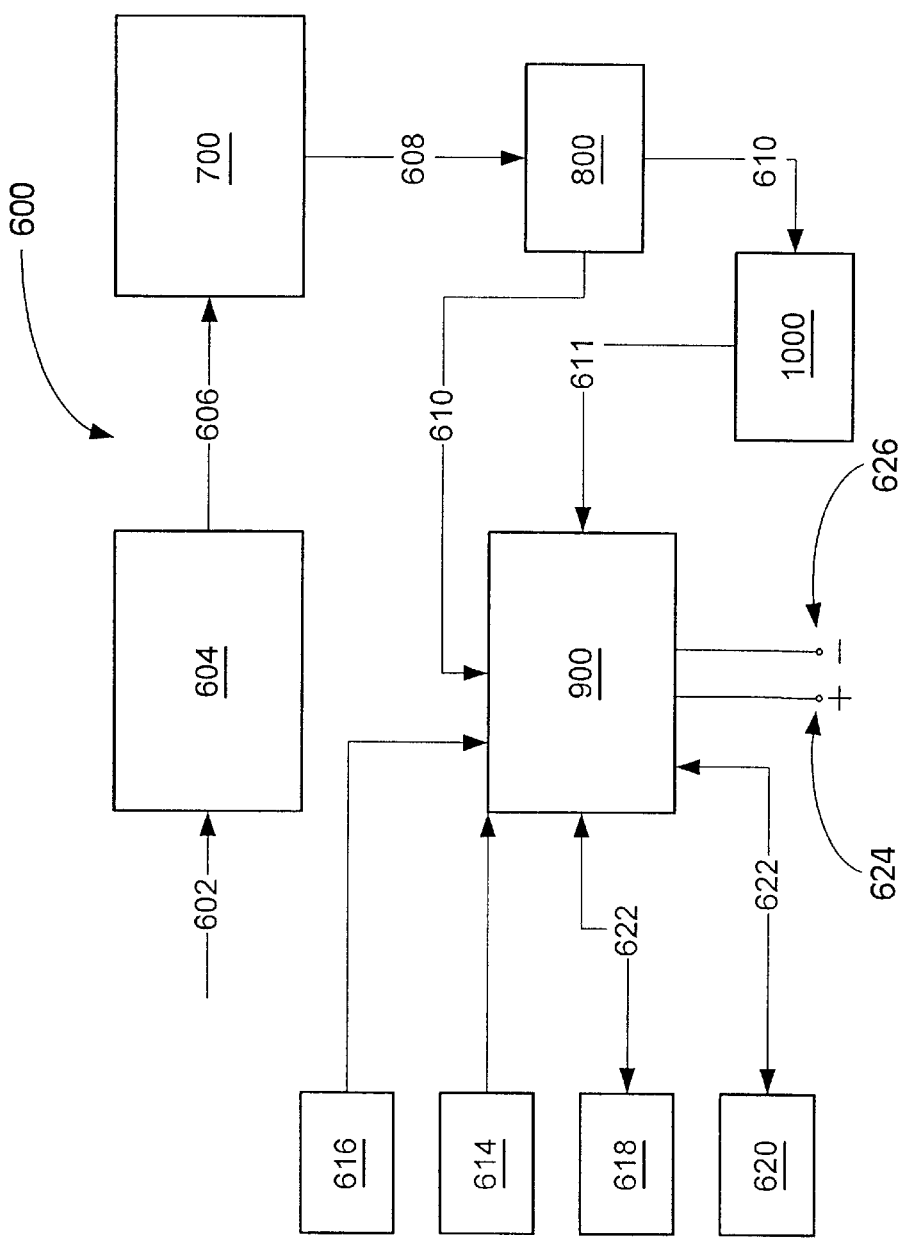
FIG. 12 depicts a block diagram of another preferred embodiment of a solid-state cathodic protection apparatus of the present invention.

Referring now to FIG. 12, a second preferred embodiment of the present invention 600 is shown to comprise at least a three-phase AC input 602 and a transformer unit 604 for stepping the AC current down to a desired transformed voltage 606. The transformed voltage 606 from the transformer unit 604 is forwarded to a rectifier unit 700 which converts the transformed voltage 606 into a fall-wave rectified DC output 608. The rectified DC voltage 6 is then forwarded to a IGBT unit 800 to form a modulated, rectified DC output 610, where the IGBT unit 800 is adapted to modulate and regulate the DC output voltage and current of the apparatus 600. The modulated, rectified DC output 610 is then forwarded to a main unit 900 and a DC feedback unit 1000 adapted to produce a feedback output 611, which is forwarded to the main unit 900. The main unit 900 coupled with the IGBT unit 800 and feedback unit 1000 converts the modulated, rectified DC output 610 into a square-wave, modulated, rectified DC or final output 612. The final output 612 is then used to protect structures such as underground pipelines by connecting a cathodic terminal 624 to the structure and the anode terminal 626 to sacrificial anode buried in the ground as shown in FIG. 2. The embodiment 600 further includes a shunt unit 614 and a load unit 616. The embodiment 600 can also include lighting protection circuitry 618, battery backup circuitry 620, and other auxiliary circuitry in electrical communication with the units in the apparatus 600 shown as connection elements 622.

Figures 13, 15:
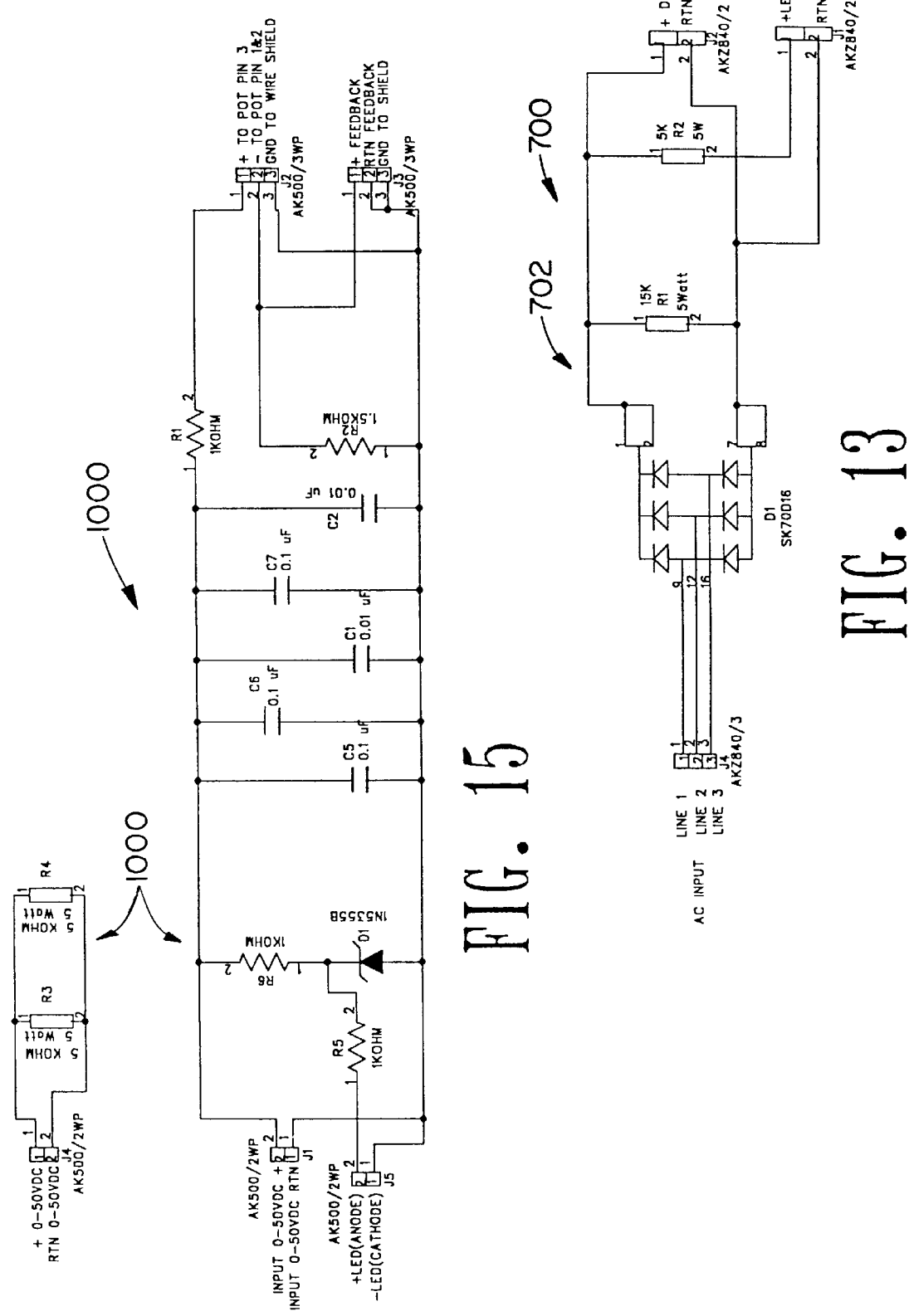
FIG. 13 depicts a preferred circuit for a rectifier board assembly of the apparatus the present invention.
FIG. 15 depicts a preferred circuit for a DC Feedback board of the apparatus the present invention.

Referring now to FIG. 13, a preferred circuit layout 702 of the rectifier unit 700 of the embodiment 600 of FIG. 12 is shown to comprise at least three, three phase bridge rectifiers D1, three connectors J1, J2 and J3, two resistors R1 and R2 and an light emitted diode, LED. The connector J1 connects the rectifier unit 700 to the three-phase AC input. The connector J1 includes a DC output and an RTN output and the connector J3 includes an LED anode and an RTN cathode lead.

The preferred components for the preferred circuit layout 702 for the rectifier unit 700 are set forth in the following component list:

| Components List for the Rectifier Unit 700 | |
|---|---|
| Ref | Description |
| D1 | Three Phase Bridge Rectifier, 90 Amp, 1600 Volt |
| J1 | Connector, 2 Pole 300 V, 30 Amp |
| J2 | Connector, 2 Pole 300 V, 30 Amp |
| J4 | Connector, 3 Pole 300 V, 30 Amp |

-continued

| Components List for the Rectifier Unit 700 | |
|---|---|
| Ref | Description |
| R1 | Resistor, 1% 15 KOHM, 5 Watt |
| R2 | Resistor, 1% 5 KOHM, 5 Watt |
| LED | LED, Yellow, Clear |

Although a preferred circuit is set forth in FIG. 13 and the preferred electrical elements and electrical contacts are shown, it should be recognized that other circuit designs can be constructed by skill artisans to yield the same square-wave output of the present invention and such other circuit designs are considered a part of this disclosure or equivalent to the circuit set forth in FIG. 13.

Figure 14:
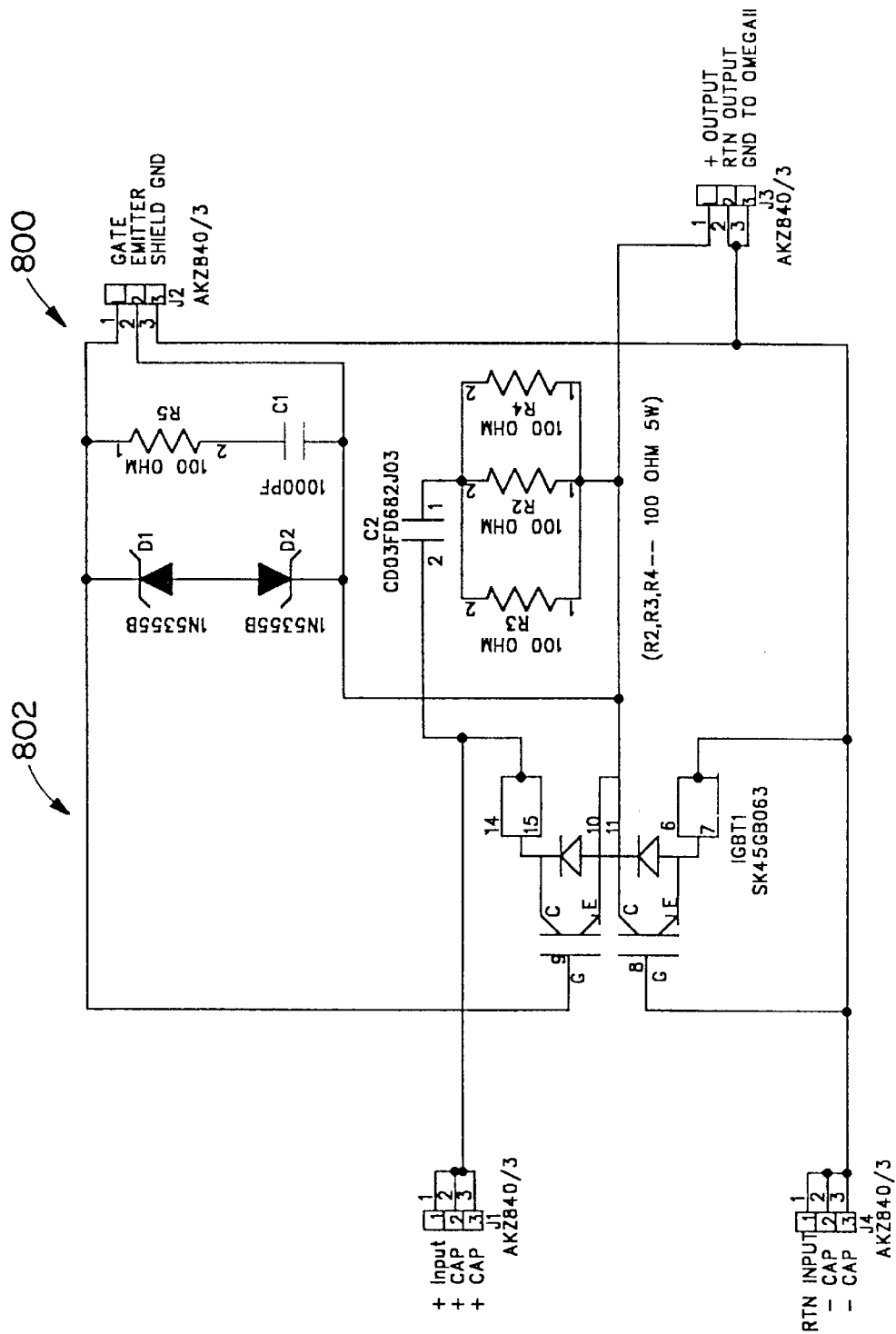
FIG. 14 depicts a preferred circuit for an integrated gate bipolar transistor board of the apparatus the present invention.

Referring now to FIG. 14, a preferred circuit layout 802 of the IGBT unit 800 of the embodiment 600 of FIG. 12 is shown to comprise at least an insulated, gate bipolar power transistor IGBT1, four, three pole connectors J1, J2, J3 and J4, four resistors R2, R3, R4, and R5, two capacitors C1 and C2 and two diodes D1 and D2. The connector J1 and J4 are connected to the rectifier unit 700 DC and RTN output, respectively. The connector J2 includes a gate, emitter and shield ground output, while the connector J4 includes a positive output, an RTN output and a ground to the main board 900.

The preferred components for the preferred circuit layout 802 for the rectifier unit 800 are set forth in the following component list:

| Component List for the IGBT Unit 800 | | | |
|---|---|---|---|
| Ref | Description | Ref | Description |
| IGBT1 | IGBT Module, 30 Amp, 600 Volt Dual | R4 | Resistor 100 Ohm, 5 Watt |
| J1 | Connector, 300 Volt, 30 Amp, Three Pole | R5 | Resistor 100 Ohm, ¼ Watt |
| J2 | Connector, 300 Volt, 30 Amp, Three Pole | C1 | Capacitor, 1000 PF, 100 Volt |
| J3 | Connector, 300 Volt, 30 Amp, Three Pole | D1 | Diode Zener, 18 Volt, 5 Watt |
| J4 | Connector, 300 Volt, 30 Amp, Three Pole | D2 | Diode Zener, 18 Volt, 5 Watt |
| R2 | Resistor 100 Ohm, 5 Watt | C2 | Capacitor, 3300 PF, 1500 Volt or Capacitor, Mica, 6800 PF, 500 Volt |
| R3 | Resistor 100 Ohm, 5 Watt | | |

Although a preferred circuit is set forth in FIG. 14 and the preferred electrical elements and electrical contacts are shown, it should be recognized that other circuit designs can be constructed by skill artisans to yield the same square-wave output of the present invention and such other circuit designs are considered a part of this disclosure or equivalent to the circuit set forth in FIG. 14.

Referring now to FIG. 15, a preferred circuit layout 902 for the main unit 900 of the embodiment of the FIG. 12 is shown to comprise at least the components listed in the following component list arranged as shown in the layout 902. The connector J3 is connected to the output connector J2 of the IGBT unit 800. The connector J4 is connected to an LED. The connector J2 is connected to the Feedback unit 1000 output, to a shutdown, to a 15 VDC source and to the shunt element 614. The connector J1 is connected to a 120 V AC input.

Component List for the Motherboard

| Ref | Description | Ref | Description |
|---|---|---|---|
| D7 | Diode, Fast Switching Rectifier 1.0 A, 600 V | C5 | Capacitor, Tantalum, 10 uF 50 V |
| D8 | Diode, Fast Switching Rectifier 1.0 A, 600 V | C6 | Capacitor, Tantalum, 10 uF 50 V |
| D9 | Diode, Fast Switching Rectifier 1.0 A, 600 V | C8 | Capacitor, Electrolytic 220 uF 35 V |
| D10 | Diode, Fast Switching Rectifier 1.0 A, 600 V | C9 | Capacitor, Electrolytic 220 uF 35 V |
| Z1 | Diode, Zener 18 V, 5 W | C10 | Capacitor, Electrolytic 220 uF 35 V |
| Z4 | Diode, Zener 18 V, 5 W | C11 | Capacitor, Electrolytic 220 uF 35 V |
| Z5 | Diode, Zener 18 V, 5 W | C12 | Capacitor, Electrolytic 220 uF 35 V |
| Z2 | Diode, Zener 30 V, 5 W | C13 | Capacitor, Electrolytic 220 uF 35 V |
| Z3 | Diode, Zener 30 V, 5 W | U4 | Single Channel IGBT Driver (8 Pin PDIP Package) |
| Q1 | Transistor, PNP | U3 | 15 Volt Voltage Regulator TO-220 Package |
| J1 | Printed Circuit Board Terminal Block, 2 Pole | R2 | Resistor, 1.0 Ohm 20 Watt |
| J4 | Printed Circuit Board Terminal Block, 2 Pole | R19 | Resistor, 10 KOHM, ¼ Watt |
| J3 | Printed Circuit Board Terminal Block, 3 Pole | R11 | Resistor, 10 KOHM, ¼ Watt |
| J2 | Printed Circuit Board Terminal Block, 8 Pole | R6 | Resistor, 100 KOHM, ¼ Watt |
| C1 | Capacitor, Ceramic 1000 PF, 200 V | R9 | Resistor, 100 KOHM, ¼ Watt |
| C2 | Capacitor, Ceramic 0.01 uF, 100 V | R16 | Resistor, 100 KOHM, ¼ Watt |
| C16 | Capacitor, Ceramic 0.01 uF, 100 V | R17 | Resistor, 100 KOHM, ¼ Watt |
| C3 | Capacitor, Ceramic 0.1 uF, 100 V | R20 | Resistor, 1 Mega Ohm ¼ Watt |
| C14 | Capacitor, Ceramic 0.1 uF, 100 V | R21 | Resistor, 1 Mega Ohm ¼ Watt |
| C21 | Capacitor, Ceramic 0.1 uF, 100 V | R1 | Resistor, 1.5 KOHM, ¼ Watt |
| C22 | Capacitor, Ceramic 0.1 uF, 100 V | R12 | Resistor, 1.5 KOHM, ¼ Watt |
| C23 | Capacitor, Ceramic 0.1 uF, 100 V | R7 | Resistor, 15 KOHM, ¼ Watt |
| C31 | Capacitor, Ceramic 0.1 uF, 100 V | R8 | Resistor, 15 KOHM, ¼ Watt |
| C32 | Capacitor, Ceramic 0.1 uF, 100 V | R5 | Resistor, 2 KOHM, ¼ Watt |
| C33 | Capacitor, Ceramic 0.1 uF, 100 V | R22 | Resistor, 250 KOHM, ¼ Watt |
| C34 | Capacitor, Ceramic 0.1 uF, 100 V | R15 | Resistor, 300 KOHM, ¼ Watt or 301 KOHM, RN55D3013F ¼ W |
| C15 | Capacitor, Ceramic 1 uF, 50 V | R3 | Resistor, 33 OHM, ¼ W |
| C4 | Capacitor, Ceramic 1 uF, 50 V | R4 | Resistor, 33 OHM, ¼ W |
| C17 | Capacitor, Ceramic 1 uF, 50 V | R18 | Resistor, 4.02 KOHM, ¼ W |
| C18 | Capacitor, Ceramic 1 uF, 50 V | R10 | Resistor, 49.9 KOHM, ¼ W |
| C19 | Capacitor, Ceramic 1 uF, 50 V | R13 | Resistor, 49.9 KOHM, ¼ W |
| C24 | Capacitor, Ceramic 1 uF, 50 V | R14 | Resistor, 4.99 KOHM, ¼ W or 5.11 KOHM, RN55D5111F, ¼ W |
| C25 | Capacitor, Ceramic 1 uF, 50 V | D4 | Transient Vage Suppressor 26.7–29.5 V Bidirectional |
| C26 | Capacitor, Ceramic, 1 uF, 50 Volt | D5 | Transient Vage Suppressor 26.7–29.4 V Bidirectional |
| C27 | Capacitor, Ceramic, 1 uF, 50 Volt | D6 | Transient Vage Suppressor 24.4–26.9 V Bidirectional |
| C28 | Capacitor, Ceramic, 1 uF, 50 Volt | U2 | Regulating Pulse Width Modulator DIP16 Package |
| C29 | Capacitor, Ceramic, 1 uF, 50 Volt | U1 | High Speed CMOS Dual OP AMP (DIP8 Package) |
| C30 | Capacitor, Ceramic, 1 uF, 50 Volt | MOV1 | Metal Oxide Varistor 130 VRMS, 175 VDC |
| C7 | Capacitor, Ceramic, 4700 PF, 100 Volt | D2 | Diode Bridge 200 V, 1.5 Amp |
| T1 | Transformer, Pri 115/230 50/60 Hz, Sec 30 V CT 0.08 A-15 V 0.16 A | PCB | Motherboard PC BOARD |

Although a preferred circuit is set forth in FIG. 15 and the preferred electrical elements and electrical contacts are shown, it should be recognized that other circuit designs can be constructed by skill artisans to yield the same square-wave output of the present invention and such other circuit designs are considered a part of this disclosure or equivalent to the circuit set forth in FIG. 15.

Figure 16:
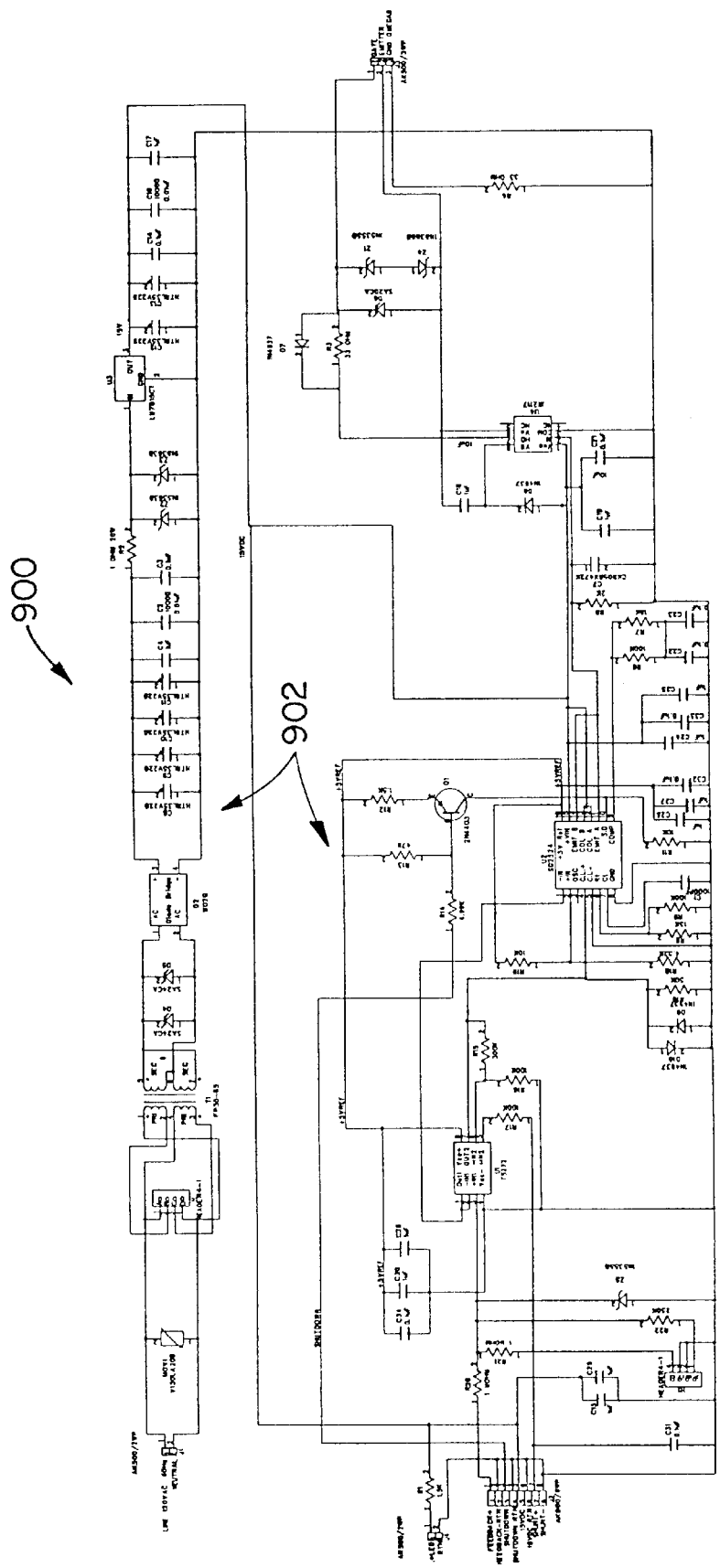
FIG. 16 depicts a preferred circuit for a main board of the apparatus the present invention.

Referring now to FIG. 16, a preferred circuit layout 1002 of the Feedback unit 1000 of FIG. 12 is shown to comprise at least include the preferred components set forth in the following component list. The connector J1 and J4 are connected to zero to 50 V DC source. The connector J2 is connected to a pot. The connector J3 is connected to the connector J2 of the main unit 900 and supplies a Feedback output and ground. The connector J5 is connected to an LED.

Component List For DC Feedback Unit 1000

| Ref | Description | Ref | Description |
|---|---|---|---|
| R1 | Resistor, 1 KOHM, ½ Watt | C5 | Capacitor, Ceramic 0.1 uF, 100 V |
| R2 | Resistor, 1.5 KOHM, ½ Watt | C6 | Capacitor, Ceramic 0.1 uF, 100 Volt |
| R3 | Resistor, 5 KOHM, 5 Watt | C7 | Capacitor, Ceramic 0.1 uF, 100 Volt |
| R4 | Resistor, 5 KOHM, 5 Watt | D1 | Diode, Zener, 18 Volt |
| R5 | Resistor, 1 KOHM, 5 Watt | J1, J4 | Connector, 2 Pole |
| R6 | Resistor, 1 KOHM, 5 Watt | J5 | Connector, 2 Pole |
| C1 | Capacitor, Ceramic 0.01 uF, 100 V | J2 | Connector, 3 Pole |
| C2 | Capacitor, Ceramic 0.01 uF, 100 V | J3 | Connector, 3 Pole |

Although a preferred circuit is set forth in FIG. 16 and the preferred electrical elements and electrical contacts are shown, it should be recognized that other circuit designs can be constructed by skill artisans to yield the same square-wave output of the present invention and such other circuit designs are considered apart of this disclosure or equivalent to the circuit set forth in FIG. 16.

All references and patents cited herein are incorporated herein by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

I claim:

1. A cathodic corrosion inhibiting apparatus comprising:
an AC inlet for receiving an AC input;
a transformer for transforming the AC input into a transformed AC output having a transformed AC output voltage less than the starting AC input voltage and a transformed AC output current adjusted to a desired level;
a rectifier for converting the transformed AC input into a rectified output;
a square-wave generator or converter for converting the rectified output into a substantially square-wave output having less than about a 12% ripple or AC component, a voltage/current rating between about 40V/5A and about 200V/200A, a power rating between about 200 VA and about 4 kVA, and a switching frequency between about 15 kHz and about 30 kHz;
an anodic output terminal for connecting to an anode; and
a cathodic output terminal for connecting to a metallic apparatus or structure,
where the square-wave output reduces corrosion by maintaining the metallic apparatus at a voltage of less than or equal to −850 mV.

2. The apparatus of claim 1, wherein the ripple is less than about 10% and the switching frequency is between about 15 kHz and about 25 kHz.

3. The apparatus of claim 1, wherein the ripple is less than about 5% and the switching frequency is between about 20 kHz and about 23 kHz.

4. The apparatus of claim 3, wherein the ripple is less than about 3%.

5. The apparatus of claim 3, wherein the ripple is less than about 1%.

6. A cathodic corrosion inhibiting apparatus comprising:
an AC inlet for receiving an AC input;
a transformer for transforming the AC input into a transformed AC output, where a transformed, output voltage of the transformer is less than a starting AC input voltage and a transformed output current of the is adjusted to a desired level;
a rectifier for converting the transformed AC input into a rectified DC output;
a square-wave generator or converter including a IGBT unit, a feedback unit and a main unit, where the square-wave generator converts the rectified output into a substantially square-wave output having less than about a 12% ripple or AC component, a voltage/current rating between about 40V/5A and about 200V/200A, a power rating between about 200 VA and about 4 kVA, and a switching frequency between about 15 kHz and about 30 kHz;
an anodic output terminal for connecting to an anode; and
a cathodic output terminal for connecting to a metallic apparatus or structure,
where the square-wave output reduces corrosion by maintaining the metallic apparatus at a voltage of less than or equal to −850 mV.

7. The apparatus of claim 6, wherein the ripple is less than about 10% and the switching frequency is between about 15 kHz and about 25 kHz.

8. The apparatus of claim 6, wherein the ripple is less than about 5% and the switching frequency is between about 20 kHz and about 23 kHz.

9. The apparatus of claim 8, wherein the ripple is less than about 3%.

10. The apparatus of claim 8, wherein the ripple is less than about 1%.

11. A process for inhibiting corrosion comprising the steps of:
applying across a metallic structure or portion thereof a substantially square-wave rectified DC signal having a minimal ripple or AC component to maintain the structure at a cathodic voltage less than or equal to −850 mV, where the signal is supplied by a cathodic protection system comprising:
an AC inlet for receiving an AC input;
a transformer for transforming the AC input into a transformed AC output, where a transformed, output voltage of the transformer is less than the starting AC input voltage and a transformed AC output current of the transformer is adjusted to a desired level;
a rectifier for converting the transformed AC input into a rectified DC output;
a square-wave generator or converter for converting the rectified output into a substantially square-wave output having less than about a 12% ripple or AC component, a voltage/current rating between about 40V/5A and about 200V/200A, a power rating between about 200 VA and about 4 kVA, and a switching frequency between about 15 kHz and about 30 kHz;

an anodic output terminal for connecting to an anode; and a cathodic output terminal for connecting to a metallic apparatus or structure.

12. The process of claim 11, further comprising the step of:

adjusting the square-wave DC signal to optimize cathodic protection of the structure.

13. The process of claim 11, further comprising the step of: periodically adjusting the square-wave DC signal to optimize cathodic protection of the structure.

14. The process of claim 11, wherein the ripple is less than about 10% and the switching frequency is between about 15 kHz and about 25 kHz.

15. The process of claim 11, wherein the ripple is less than about 5% and the switching frequency is between about 20 kHz and about 23 kHz.

16. The process of claim 11, wherein the ripple is less than about 1% and the switching frequency is between about 20 kHz and about 23 kHz.

* * * * *